July 31, 1945.  F. E. JOHNSON  2,380,895
SHIFTABLE COWL FASTENER
Filed Aug. 24, 1943
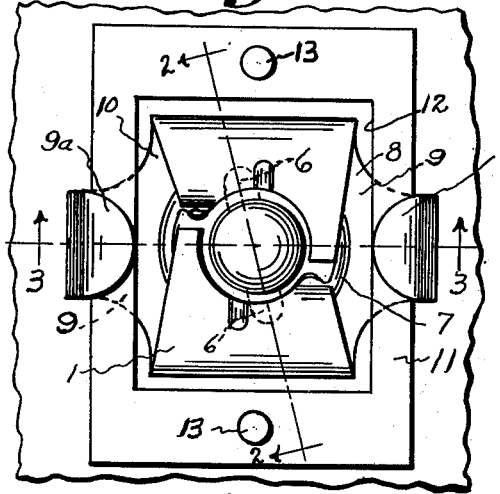
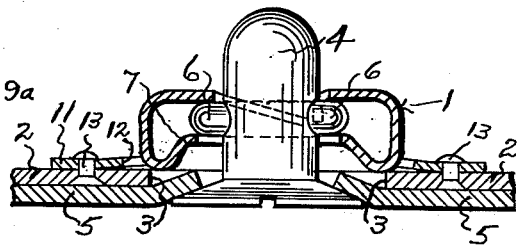
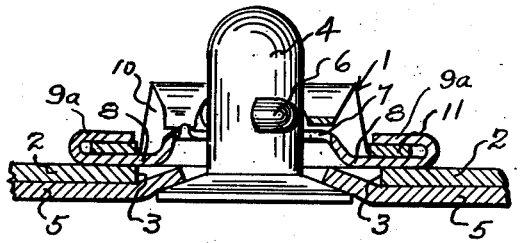
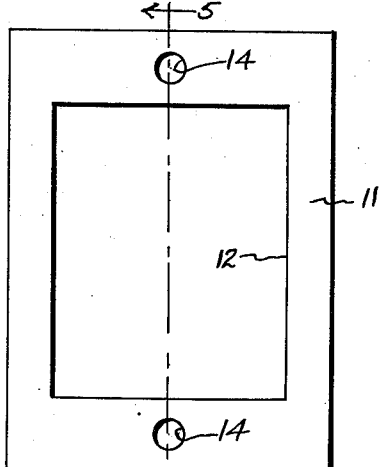
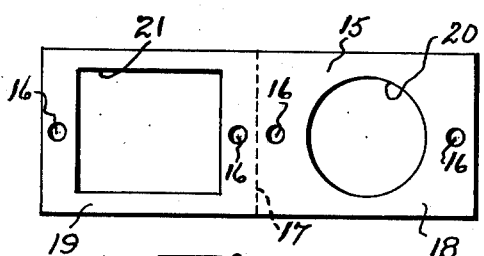
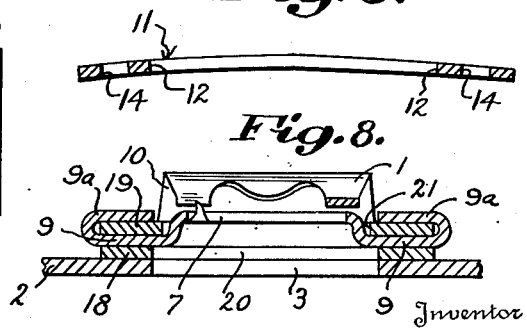
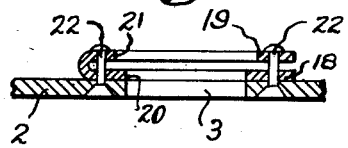
Inventor
Frank E. Johnson.
By Walter J. Jones
Attorney Patented July 31, 1945

2,380,895

UNITED STATES PATENT OFFICE 2,380,895

SHIFTABLE COWL FASTENER

Frank E. Johnson, Malden, Mass., assignor to United-Carr Fastener Corporation, Cambridge, Mass., a corporation of Massachusetts Application August 24, 1943, Serial No. 499,860

3 Claims. (Cl. 24—221)

The present invention relates to improvements in rotary operative type fasteners such as those employed for connecting aircraft cowling sheets together and aims generally to improve existing fasteners of that type.

One of the main objects of the invention is the provision of an improved and simplified fastener-attaching means for attaching the female or socket fastener part to its support in a manner to permit shiftability of the fastener part relative to an aperture in the support so as to be more readily aligned with the stud member mounted in the part to be attached to the support.

Illustrative of the invention reference is made to the accompanying drawing and annexed specification illustrating and describing two preferred embodiments of the invention.

In the drawing:

Fig. 1 is a plan view of one type of female or socket fastener part used in connection with one form of improved attaching means according to the invention;

Fig. 2 is a transverse central sectional view of a fastened installation according to Fig. 1 as taken on the line 2—2 of Fig. 1;

Fig. 3 is a longitudinal central sectional view thereof as taken on the line 3—3 of Fig. 1;

Fig. 4 is a plan view of one form of attaching means according to the present invention;

Fig. 5 is an edge view thereof;

Fig. 6 is a plan view of an alternative form of attaching means;

Fig. 7 is a central sectional view thereof showing the attaching means secured to a support; and Fig. 8 is a section of the alternate form showing the socket member and attaching means as positioned on a support.

Referring more particularly to the drawing, the invention provides new and simplified means for shiftably attaching a female or socket fastener member to a suitable apertured support, such as an airplane cowling sheet, though it will be understood that the invention is susceptible of general application and is not restricted to such use.

Rotary operative type fasteners such as those used for securing aircraft cowling sheets together usually include a female or socket fastener member 1 suitably attached to one side of a support 2 formed with an aperture 3 therein and adapted to receive and interlock with a rotary male fastener member 4 rotatably mounted in a part 5 to be secured to the support 2. The rotary male fastener element 4 preferably is formed with lateral projections 6, such as radial arms, adapted to overlie and be engaged with a locking seat 7 of the female fastener 1. The female fastener part advantageously includes a base portion 8 having lateral bearing extensions 9, and the locking seat 7 extends outwardly from the base portion 8 to engage the radial arms 6 of the male element 4 in spaced relation to the support 2 and thus hold the support 2 and the part 5 in rigid fastened relationship. If desired, the female fastening element may be formed with outwardly extending wings 10 adapted to overlie the locking seat 7, and provide stop and/or ejector means for the male element 4, as disclosed in the patent to William A. Bedford, Jr., No. 2,306,928, dated December 29, 1942.

The invention provides an improved attaching plate for shiftably mounting the female or socket fastener member 1 and for attaching it to the support 2 overlying the aperture 3 thereof. According to the form of invention shown in Figs. 1 to 5, the attaching means comprises a substantially flat plate member 11 which in the illustrated embodiment may be substantially rectangular in form and formed with a substantially rectangular aperture 12 therein of a size to loosely receive the portions of the female fastener part which extend outwardly from the base 8, as for example the wings 10. The aperture 12 of the plate 11 is preferably substantially larger than the aperture 3 of the support 2 and is also larger than the outwardly disposed locking seat 7 or the wings 10 so that the latter may be shiftable within the aperture 12. The plate 11 may be securely attached to the support 2 by suitable means, as for example rivets 13 passing through apertures 14 in the plate and secured in the support 2.

Advantageously the terminal ends 9ª (Figs. 1 and 3) of the bearing extensions 9 extend beyond the outer marginal edges of the plate 11 and are turned upwardly to overlie portions of said marginal edges so as to pre-assemble the attaching plate with the female fastener member and permit their attachment to the support 2 as a unit. In this case the plate and socket are pre-assembled and heat-treated after assembly.

As will be apparent from Fig. 1, the female fastener member 1 is retained in operative position relative to the support 2 by means of the marginal sides of the attaching plate 11 which overlie bearing extensions 9 of the female fastener. As the aperture 12 of the attaching plate is larger than the wings 10 of the female fastener member, the latter may have slight shiftability under the attaching member and relative to the aperture 3 of the support 2. This permits a quicker and more ready alignment of the female member with the male member 4 as the parts 2 and 5 are brought into juxtaposed position.

A slightly modified form of the invention is illustrated in Figs. 6 and 7. According to this form of the invention the attaching member may be in the form of an elongated strip 15 having a plurality of rivet holes 16 therein, which strip is adapted to be folded along a median line 17 so as to provide wear plate portion 18 and a superposed retainer plate portion 19. The wear plate portion 18 is provided with an aperture 20 adapted to align or surround the aperture 3 of the support 2 to permit the passage of the male fastener element therethrough. The retainer plate portion 19 may be provided with enlarged opening 21, herein illustrated as rectangular in form and corresponding to the opening 12 of the plate 11, to loosely receive the outwardly extending locking seat 7 or wings 10 of the female fastener part. In this construction the bearing extensions 9 of the female fastener part are loosely retained between the wear plate and the marginal sides of the retainer plate, the wear plate providing a smooth supporting surface for slidably supporting the bearing extensions 9 of the female fastener. Suitable fastening means, as for example rivets 22, may be passed through the aligned apertures 16 and through the support 2 to secure the attaching member to the support.

Advantages of the invention reside in the simplicity of the construction of the attaching plate which makes possible the ready assembly of the female or socket fastening member thereof and the removal of it therefrom prior to the attachment of the support. The socket member is thus shiftably attached to the attaching plate and may be laterally shifted relative to the aperture 3 of the support 2 to facilitate lining it up with the male fastener element. Furthermore, the fastened installation may creep slightly due to the shiftable mounting of the socket member without tendency to cause relative rotation between the female or socket fastener member and the male fastener member 4 to unlocked position.

Although I have illustrated and described preferred forms of my invention, I do not wish to be limited thereby because the scope of my invention is best defined by the following claims.

I claim:

1. The combination of an apertured support, a female fastener member to be attached to one face of said support including a base having lateral bearing extensions disposed substantially in the plane of the base and intermediate laterally spaced portions extending outwardly from the plane of the base and means for attaching said female fastener member to said base providing shiftability thereof relative to said support aperture comprising a generally rectangular apertured attaching plate having portions overlying the bearing extensions of said fastener and loosely surrounding said outwardly extending portions thereof whereby the outwardly extending portion passes through the aperture in said attaching plate and connections for securing said attaching plate to said support.

2. The combination of an apertured support, a female fastener member to be attached to one face of said support including a base having lateral bearing extensions disposed substantially in the plane of the base and intermediate portions extending outwardly from the plane of the base, means for attaching said female fastener member to said base providing shiftability thereof relative to said support aperture comprising a wear plate having an apertured portion substantially conforming to the aperture of said support, a retainer member attached to one edge of and overlying said wear plate in spaced relation thereto and having an apertured portion loosely receiving said outwardly extending fastener portions and fastening means for securing said attaching means to said support.

3. The combination of an apertured support, a female fastener member to be attached to one face of said support including a base having lateral bearing extensions disposed substantially in the plane of the base and intermediate portions extending outwardly from the plane of the base, means for attaching said female fastener member to said base providing shiftability thereof relative to said support aperture comprising a wear plate having an apertured portion substantially conforming to the aperture of said support, a retainer member attached to one edge of and overlying said wear plate in spaced relation thereto and having an apertured portion loosely receiving said outwardly extending fastener portions and fastening means extending through said retainer member, wear plate and support for securing the parts together.

FRANK E. JOHNSON.